United States Patent [19]

Ross

[11] 4,281,701

[45] Aug. 4, 1981

[54] VEHICLE TIRE HAVING RUN FLAT INSERT

[75] Inventor: William C. Ross, Winchester, Mass.

[73] Assignee: W. R. Grace & Co., Cambridge, Mass.

[21] Appl. No.: 121,842

[22] Filed: Feb. 15, 1980

[51] Int. Cl.³ .............................................. B60C 17/04
[52] U.S. Cl. ............................. 152/158; 152/330 RF; 156/110 R; 428/36; 428/109
[58] Field of Search ............... 152/151, 155, 158, 246, 152/310, 311, 312, 314, 330 R, 330 RF, 331, 339, 340; 156/110 R, 117, 169, 173, 175, 123 R, 132, 131, 133; 428/36, 105, 107, 109, 192

[56] References Cited

U.S. PATENT DOCUMENTS

| | | | |
|---|---|---|---|
| 3,568,286 | 3/1971 | Ross | 29/121 |
| 3,638,701 | 2/1972 | Rossler | 152/158 |
| 3,730,244 | 5/1973 | Ross | 152/323 |
| 3,730,794 | 5/1973 | Ross | 156/112 |
| 3,828,836 | 8/1974 | Bradley | 152/158 |
| 3,872,907 | 3/1975 | Curtiss et al. | 152/158 |
| 4,137,894 | 2/1979 | Gardner et al. | 152/330 RF |
| 4,137,960 | 2/1979 | Cataldo | 152/158 |
| 4,153,095 | 5/1979 | Sarkissian | 152/340 |
| 4,157,107 | 6/1979 | Cataldo | 152/330 RF |
| 4,163,466 | 8/1979 | Watts | 152/158 |

Primary Examiner—John E. Kittle
Attorney, Agent, or Firm—C. Edward Parker; William L. Baker

[57] ABSTRACT

A pneumatic vehicle tire having an internal device to impart run-flat capability is described, the device being comprised of an outer ring member for rotational support when operating in the run-flat condition, and an inner support for the ring which is highly flexible before insertion within the tire and which becomes fixed and less flexible after insertion. In preferred aspects the ring is essentially a highly flexible porous body made up of successive circumferential windings of elastomer-coated filamentary material, and the support is a structure made up of a plurality of hinged bracing elements which move into a fixed position after insertion of the device within the tire.

23 Claims, 6 Drawing Figures

VEHICLE TIRE HAVING RUN FLAT INSERT

BACKGROUND OF THE INVENTION

This invention relates to vehicle tires, and, more particularly, to pneumatic vehicle tires having "run-flat" capability.

The art has long recognized the desirability of a "run-flat" pneumatic vehicle tire, that is, a pneumatic tire which retains the ability to support the vehicle in the event of loss of air from the tire, and to this end many structures and devices have been suggested. A popular approach to imparting "run-flat" capability is to provide the tire with an internal device in the form of a ring of sufficient height and width to rotatably support the vehicle in the event of collapse of the tire. The ring may be solid or a porous rigid or flexible member simply positioned upon and supported by the tire rim. However, since the outer circumference of the insert ring must be spaced only a short distance from the treadwall of the inflated tire carcass, devices of this type tend to be heavy and to present difficulties when being installed within the tire carcass and/or when the tire is subsequently mounted upon the rim. In certain cases, special rims such as "split" or two-piece rims are required for mounting of these devices.

In other run-flat designs, the ring does not extend entirely to the rim, but rather is supported by various arrangements which attempt to lessen the overall weight of the run-flat device and/or to simplify its insertion and mounting. The need nevertheless remains for a run-flat device which is light in weight yet is practical from the standpoint of being easily installable within the tire and which does not interfere with the normal mounting of the tire.

BRIEF SUMMARY OF THE INVENTION

The present invention concerns an internal run-flat device which is light in weight, highly flexible, easily installable within the tire, and which does not interfere with normal mounting of the tire upon conventional vehicle tire rims. The device is comprised of a ring member for rotatably supporting the tire when in the run-flat condition which is dimensioned to fit within the conventional tire without contacting the treadwall or sidewalls of the tire when the tire is fully inflated, and a lightweight support member for the ring which is highly flexible before insertion into the tire, and which becomes fixed and less flexible following insertion.

DETAILED DESCRIPTION OF THE INVENTION

The invention is best described in detail having reference to the attached drawings.

Figure 1:
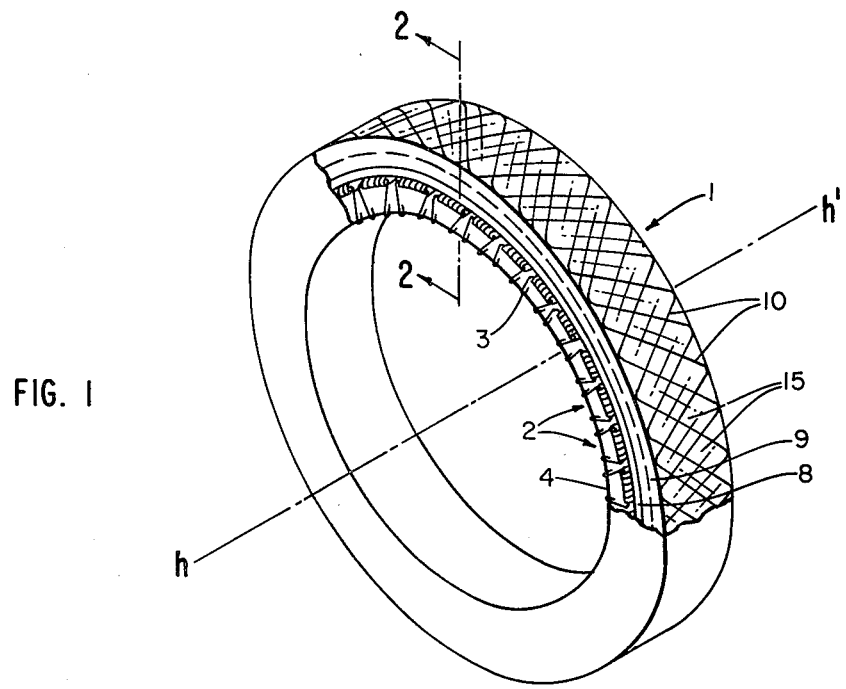
FIG. 1 is a view in perspective of the insert device according to the invention.

In FIG. 1, a run-flat device according to the invention for insertion within a conventional automobile tire carcass is shown. The device is generally made up of an outer ring member 1 and an inner supporting structure therefor, which as shown, is comprised generally of a number of circumferentially positioned, spaced, support braces, 2. The ring 1 as shown is preferably a highly compressible, flexible porous body of elastomer-coated filamentary material 10 prepared, e.g. by successive circumferential windings of such filamentary material about an axis, following the winding pattern shown in FIGS. 5 and 6, followed by curing or bonding of the elastomer into an integral unit. Filamentary bodies of this type are described in U.S. Pat. Nos. 3,568,286; 3,730,244 and 3,730,794 to the inventor herein. Such a wound, bonded, ring of elastomer-coated filament is ideal for use in the device of the invention since it can be made to be evenly balanced, possesses excellent structural strength, heat transfer and load distribution properties at an acceptable lightweight, yet is flexible and sufficiently compressible to afford good riding characteristics under load.

Figure 2:
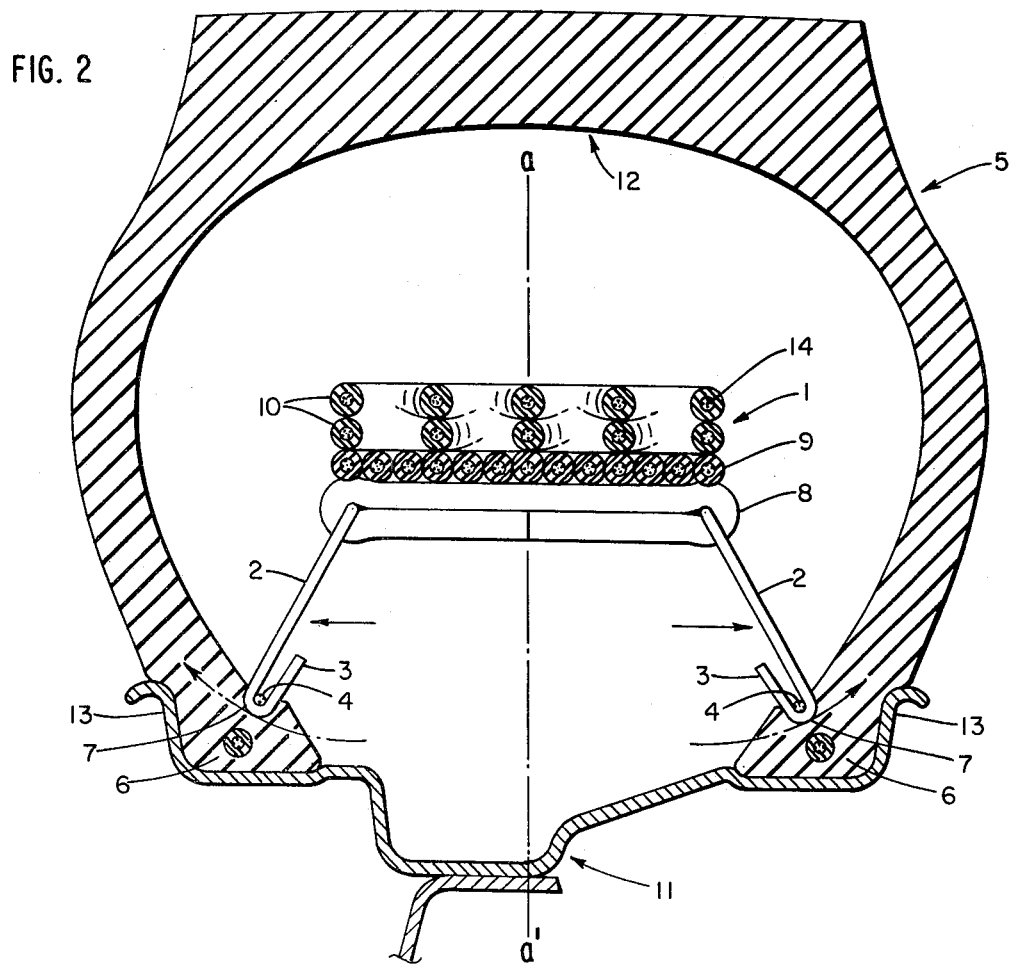
FIG. 2 is a cross-sectional view of the device of FIG. 1 installed within an automobile tire and mounted upon a conventional "one-piece" or "drop-center" rim, the view of the device being taken along the line 2—2 in FIG. 1.

The support braces 2 are of sufficiently strong material, e.g. spring steel, or reinforced plastic to give the desired support to the ring when the insert device is in run-flat operation, as fully described hereinafter. The braces are connected with the ring in a manner such that their ends 3 remote from the ring are movable outwardly from the vertical axis of the ring (a-a' in FIG. 2) in a direction indicated by the arrows in FIG. 2. The ends 3 are hooked or barbed to receive flexible non-extensible bead wires 4 which extend circumferentially and are concentric with ring 1. After insertion of the device into the tire carcass 5, the ends 3 of braces 2 are moved laterally into the position shown in FIG. 2. The ends 3 are moved over the edge of beads 6 in the direction of the arced arrows shown in FIG. 2 until they seat into recesses 7 formed in the tire beads.

Figure 3:
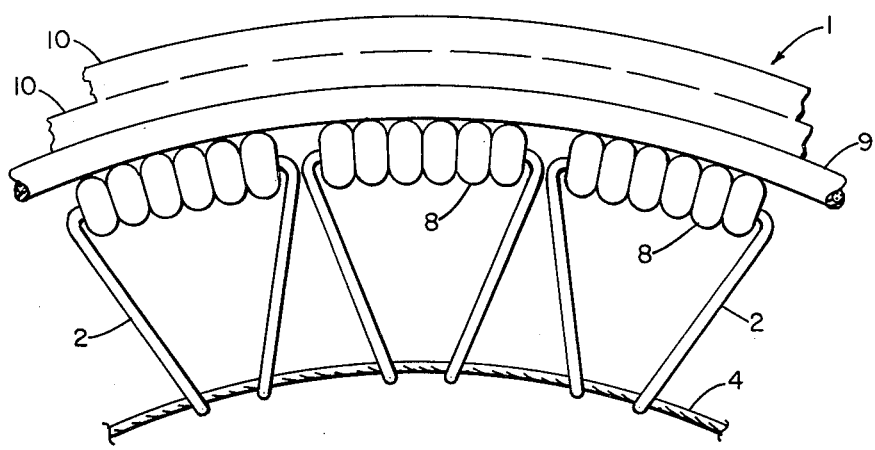
FIG. 3 is a detailed side view of the device of FIG. 1.
Figure 4:
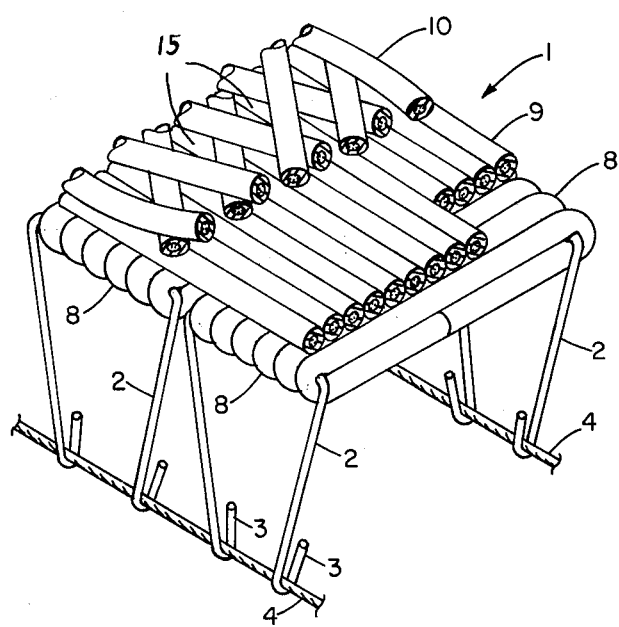
FIG. 4 is a detailed perspective view of the device of FIG. 1.

As best shown in FIGS. 3 and 4, each of the movable braces 2 has an overall generally "U"-shaped configuration, the flat closed side of the "U"-lying closest to and along the circumference of the ring. Each of the legs forming the open ends of the "U" are angled slightly towards one another to allow flexibility of the device for insertion into the tires and terminate into the hooks or barbs 3 previously mentioned. Alternatively, such legs can be closed or joined at their ends remote from the ring to form an overall triangular configuration terminating in a single hook or barb 3. Positioning the braces such that the flat, wide portion abuts the ring provides for excellent support and stability.

In the embodiment shown in the drawings, the braces 2 are held in place by a layer 8 of windings of rubber coated filamentary material or by any other material having resistance to deflection as described hereinafter. The layer 8 is made by winding such rubber coated filament around the closed ends of the "U" shaped braces in the manner shown in the drawings. The filamentary material in the layer 8 is comprised of a material having a high resistance to deflection under the weight of the vehicle upon the ring, and thus layer 8 acts to prevent collapse of the ring inwardly and downwardly towards the center of the tire rim when weight is put upon the ring. To this same end, the rubber coated filaments in layer 8 are wound substantially parallel to the horizontal axis h–h' in FIG. 1. After winding, the rubber coating is cured to form an integrally-bonded, filament-reinforced layer 8.

To prevent layer 8 and ring 1 from expanding circumferentially or radially e.g. when the tire is rotated, a layer 9 of circumferential windings of rubber-coated filamentary material is placed around the layer 8. The filaments in layer 9 are therefore for this reason wound at an angle to the filaments in layer 8, that is, at an angle, preferably substantially 90 degrees, to the horizontal axis h–h' of the ring shown in FIG. 1. As an alternative to winding individual strands of rubber-coated filamentary material, each of the layers 8 and 9 may be a layer formed from a sheet of calendered, rubber-coated filaments. Thin sheets of such calendered, rubber-coated filaments are available generally and are presently used in the construction of automobile tires.

The rubber employed in ring 1 and layers 8 and 9 is as aforementioned preferably a cured or vulcanized rubber composition, natural or synthetic. Other elastomeric materials may be employed however. The layers 8 and 9 are preferably bonded to each other and, in turn, to the ring 1 as a result of curing or vulcanization of the rubber therein, forming an integral insert device of high strength and flexibility due to the rubber to rubber bonds.

Figure 5:
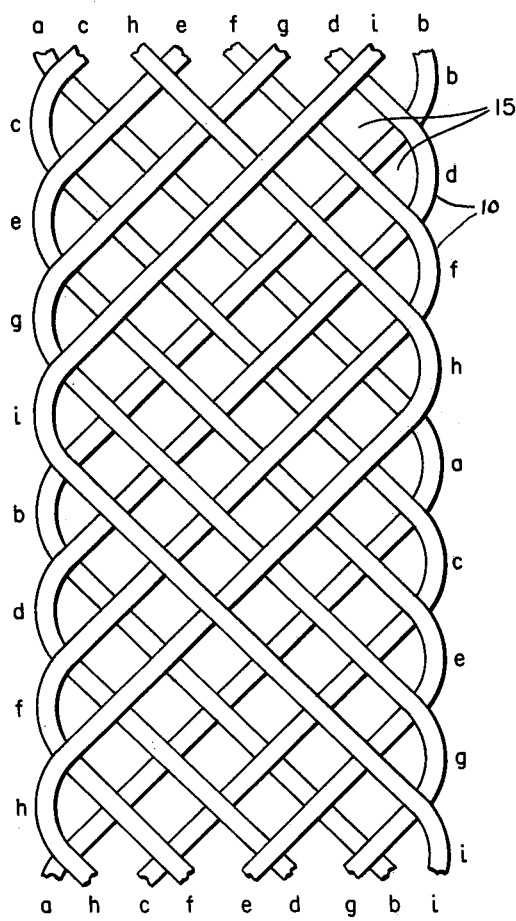
FIG. 5 is an enlarged plan view of the wound filaments 10 comprising the ring 1 in the drawings, obtained as a consequence of following the pattern of FIG. 6.
Figure 6:
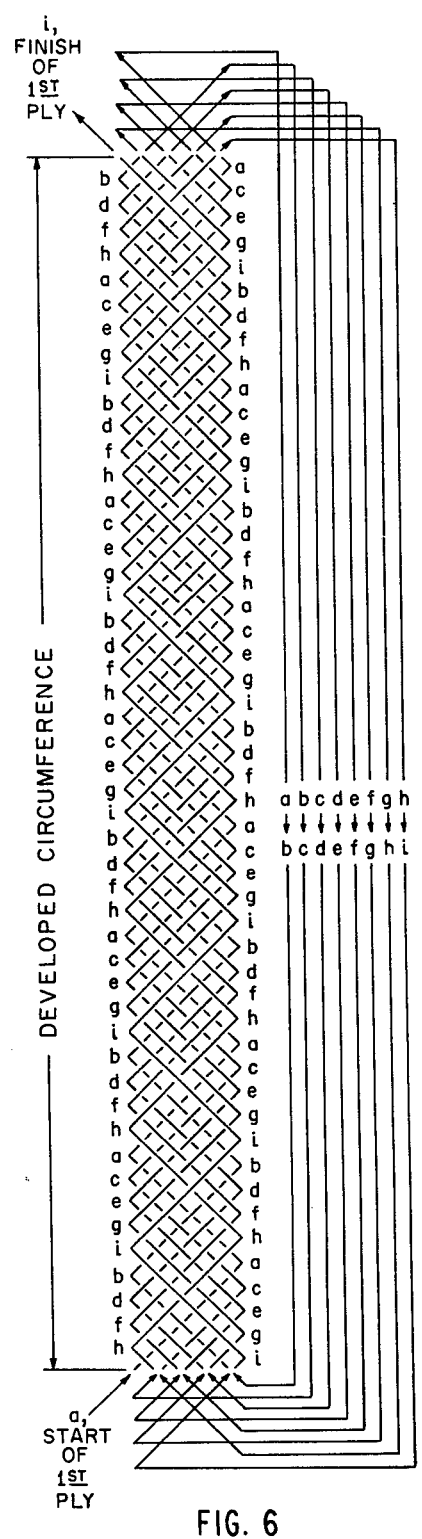
FIG. 6 is a detailed schematic illustration of one pattern of windings utilized to form the ring 10 in the device of the invention.

The compressible, void-containing or porous ring 1 shown in the drawing can be prepared by the procedures shown, as previously mentioned, in the aforementioned patents to the inventor herein, the disclosures of which are hereby incorporated by reference. In general, a filamentary material 14 is initially coated with uncured rubber composition, e.g. by extrusion, followed by successive circumferential windings of the coated filament 10 around the layer 9 shown in the drawings. A preferred pattern of windings employed to make ring 1 is shown in FIGS. 5 and 6. This manner of winding produces a ring-shaped, porous body having large diamond-shaped voids 15 therein which extend throughout the body.

The number of layers of coated filamentary material 10 in the porous body depends upon the patterns of windings employed, the diameter of the coated filament, the tension under which the filament is wound and the angle of the windings. The number of wound layers determines the degree of cushioning and reinforcement. The angle of winding filaments 10 upon layer 9 preferably ranges from substantially perpendicular to the horizontal axis of the ring (corresponding to axis h–h' in FIG. 1), to an angle of about 30° (as measured between the wound filament and the horizontal axis of the ring or conversely, to about 60° as measured between the wound filament and a perpendicular to the horizontal axis of the ring.) The term "substantially perpendicular" as used herein is intended to refer to an angle deviating from a 90° angle to the horizontal axis of the ring and is intended to exclude a 90° angle. If the filaments were wound at an angle perpendicular to the axis of the ring, e.g. a 90° angle, then successive windings would lie directly on top of each other and the windings would not progress across the face of the layer 9. A preferred angle of winding lies between about 30° and 60°, e.g. 45°, as measured between the wound filament and the horizontal axis of the ring.

The closer the filaments are spaced to each other, the smaller the voids will be and the less the compressibility. In a preferred embodiment, the void volume of the ring is not less than 10 percent. However, a void volume of less than 10 percent may be employed for low compression operations. The upper limit of the void volume is determined by the unevenness of the pressure pattern which can be tolerated for the particular employment of the insert or the amount of deflection desired for the end use.

The rubber or other elastomeric binder is preferably applied to the filamentary material in ring 1 and also layers 8 and 9 prior to winding, for example by passing the filamentary material through a solvent solution or aqueous latex containing the binder or binder composition, or by extruding a layer of the binder upon the filament using conventional extrusion techniques, e.g. passing the filament having a binder coating thereon through a die. Extrusion coating through a die is preferred since an even coating is applied in this manner.

Any elastomeric binder is suitable for use in coating and bonding the filamentary material herein. Preferably the binder is curable or vulcanizable for example curable or vulcanizable natural or synthetic rubber. After winding, the uncured binder is cured or vulcanized to improve adhesion particularly of binder to binder and/or to achieve or improve elastomeric properties and/or to increase modulus of the binder. As examples of such elastomers, mention may be made of synthetic rubber such as nitrile rubber, neoprene, natural rubber and butadiene/styrene rubbers. Small amounts of conventional additives such as vulcanizing or curing agents, antioxidants, adhesion promoters, softeners, organic accelerators, etc. can be included in the elastomeric binder composition.

At least sufficient elastomer binder material should be present on the filaments in ring 1 to permit flow of the binder into the voids thus obtaining the desired deflection in the ring. At least about 75 percent by weight of elastomeric binder based on the weight of filament is employed in the porous ring 1. Preferably at least 3 parts by weight, for example greater than 10 parts by weight, of elastomer binder are employed for each part by weight of filamentary material in the ring portion of the device of the invention.

The terms "filament" and "filamentary material" as used herein are intended to refer to an individual continuous fiber, or a plurality of fibers formed into a continuous strand, cords, yarns, and threads. Preferably, the filamentary material employed in the body of ring 1 or in layers 8 and 9 comprises a strand which has been treated by means known to the art to minimize any abrasion on the strand and/or increase adhesion to the binder during fabrication of the insert e.g. by a polymeric coating such as polyvinyl chloride, plastisol or neoprene.

The filaments which can be employed in the ring 1 include both natural and synthetic fibers such as glass, modacrylic (DYNEL), polyester (DACRON), polyethylene, polypropylene, polyvinylidene chloride, fluorocarbon, rayon, polyamide, such as nylon and aramid, acrylic, cotton, wool, graphite, boron, etc. The particular fiber employed in the porous portion 1 is selected with the end use of the insert in mind. For example, glass is a preferred filamentary material where complete elastic recovery at substantially all loads and temperatures is desired. Where relatively low loads are to be employed or if elastic recovery is not a major factor in the use of the insert, other materials may be employed. For example, DYNEL, which has 100 percent elastic recovery at 2 percent elongation could be selected for relatively low load operations. A preferred glass filament is a continuous filament glass yarn, prepared by twisting and/or plying a number of fiberglass fibers. A polymeric coating is applied to the yarn to make the glass non-friable and to improve adherence to the coating.

Another preferred filamentary material for use in the compressible porous ring 1 is prepared from aromatic polyamides or aramids. KEVLAR, (a trademark of DuPont de Nemours, E. I. & Co.) which is an aromatic polyamide fiber possessing high tensile strength said to have greater resistance to elongation than steel and used in radial tires, is a preferred filamentary material when such properties are desired.

The filament 10, in ring 1, should be substantially covered by the rubber binder or have a sufficient uniformity of pattern of deposited binder to give a uniform compression profile under load.

To provide, for example, extra cushion, in ring 1 the elastomeric binder can be caused to foam utilizing conventional methods. Any of the well-known foaming agents such as 4,4' oxybisbenzenesulfonyl hydrazide can be employed in the elastomeric binder to assure foaming of the elastomer. The extent to which the elastomer is foamed can be varied. For instance, foaming may be conducted to the extent that the spaces 15 between the filaments in the wound portion are substantially filled with cellular elastomer, the filaments being connected by a network of elastomer-elastomer bonds. In such a case, the voids in the cellular elastomeric binder permit volume-compression of the material and the elastomer-elastomer bonds in the cellular network provide a high degree of cushion to the insert. Foaming to a lesser extent provides a porous body wherein the spaces defined by the wound filaments are not entirely filled with wound cellular elastomer and the filaments are covered with a thin layer of the foamed elastomer which likewise provides cushion to the finished insert-ring.

The coated filament 10 can alternatively comprise a strand of elastomer, e.g. a rubber strand having no filamentary material therein.

As aforementioned the porous ring 1 can be rendered less extensible or expandable upon rotation, as when the tire is in operation, by using a non-extensible, or less extensible filamentary material for the filaments in layer 9 and bonding layer 9 to ring 1. A preferred filament for this application is the aforementioned "KEVLAR". Also the filamentary material used in layer 8 is preferably one having high resistance to deflection.

Also as aforementioned, it is highly preferred and advantageous that all the elastomer binders for ring 1 and layers 8 and 9 be curable or vulcanizable and further compatible so that all can be fused, adhered or cured together to form a bonded unitary device. Good results follow by employing a vulcanizable natural rubber composition as the elastomer binder components for the filaments in ring 1, layers 8 and 9, which after application and winding can be vulcanized or cured into a well-bonded unitary insert. Alternatively, the ring 1 can be separately formed and thereafter adhered to layer 9 using suitable adhesives.

The following is an example of producing a device as shown in the drawings.

EXAMPLE

A rubber composition is prepared according to the following formulation:

|  | Parts by Weight |
| --- | --- |
| Uncured natural rubber | 100 |
| Antioxidants: (Agerite D) | 1.5 |
| (Flexzone Z) | 1.5 |
| Zinc Oxide | 5 |
| Carbon Black (Cabot 351 C.B.) | 60 |
| Pine Tar | 5 |
| Sulfur | 1.2 |
| Stearic Acid | 2.0 |
| Curing Agent (Sanocure MOR) | 1.8 |
| Cure Retarder (P.V.I.) | 0.4 |
| Curing Agent (Sulfan R) | 1.5 |

The above rubber composition is coated upon a length of KEVLAR filament (e.g. DuPont 100 5/3 KELVAR) by extrusion through a Brabender crosshead extruder fitted with a circular nozzle. The diameter of the resulting rubber coated filament is approximately 0.22 inch. Sections of the coated filament are wound through the closed ends of oppositely-disposed pairs of the braces 2. The closed ends of such opposed braces are approximately 3 inches from one another and are maintained in this position by a plurality of such windings which comprise the layer 8 shown in the drawings. A number of such pairs of oppositely-disposed pairs of braces are arranged circumferentially in the manner shown in the drawings, and thereafter a continuous length of the same coated filament used in the layer 8 is wound circumferentially around the filaments in layer 8 to produce the layer 9 shown in the drawings. The diameter of layer 9 is approximately 18 inches.

Next, a continuous length of the same coated KEVLAR filament is wound using a McLean-Anderson W-1 winding machine around the layer 9 in a fashion to produce the "multi-diamond" pattern of the porous ring 1 shown in the drawings. In the method of winding, several traverses are made across the surface of layer 9 back and forth in a zig-zag fashion before one complete circumferential winding or "loop" is made about the circumference of layer 9. FIGS. 6 and 7 illustrate in schematic fashion one such winding pattern pre-calculated to form arbitrarily fifty evenly-configured diamonds about the circumference of layer 9 (and correspondingly about the circumference of the ring 1), and having four (more accurately approximately three and one-half) diamonds across the width (approximately 3 inches) of layer 9.

Referring now to FIG. 6, the initial winding of the rubber-coated filament 10 is started on the layer 9 at point "a". The winding then proceeds at a constant angle to the axis h-h' in FIG. 1 across and back in zig-zag fashion. After a number of "back-and forth" strokes (i.e. counting a traverse to the right and return to the left as one "stroke") the guide of the filament winding apparatus is just short of completing one revolution of the winding drum, and ends on the opposite side of the winding drum from the side winding was started (upper right hand corner of FIG. 6.) The winding is at a constant angle to the axis of the winding drum (approximately 45 degrees). The next windings, "b", would end after the same number of back and forth strokes (and after one revolution of the winding drum) short of the starting point but on the same side as the start of the winding. After a progression of such windings "a" through "i" shown in FIGS. 5 and 6, one "ply" pf windings exhibiting the pattern of evenly-dimensioned diamonds shown in FIGS. 5 and 6 is established. By "evenly-dimensioned" it should be understood that diamonds are "even-dimensioned" within the tolerance of the winding apparatus, and even though the diamonds are pre-calculated to be even, the inherent limitations of any mechanical winding apparatus dictate the extent to which all of the diamonds are perfectly even. As many such "plies", may be then wound directly over one another to build-up the height of the ring 1 to any desired height.

It is evident from the foregoing description, than an exceptionally lightweight and flexible device is obtained herein. The device can be flexed and distorted sufficiently to be insertable within a conventional pneumatic tire carcass. Thereafter, the ends of braces 2 are moved into the position shown in FIG. 2, by for example, an air-inflatable tube or other mechanical device. Even after locking of the device into depressions 7 in beads 6 of the tire, the device is sufficiently distortable and flexible that it will not interfere with the mounting of the tire upon the conventional "one piece" automobile tire rims.

Should the tire 5 become deflated, the treadwall 12 of the tire collapses against the outer surface of ring 1. Rotational support of the vehicle is continued however by the device of the invention. The porous highly flexible body of ring 1 acts to absorb and cushion the vehicle against both the initial impact and subsequent impacts to the tire. The ring 1 when impacted, is supported, in turn, by braces 2 which are held in place ultimately by the flanges 13 of the rim 11. Since the beads 6 of the tire are positioned between the ends 3 of the braces and flanges 13, impact upon the device of the invention ideally causes the beads 6 of the tire to be held in place against the flanges 13. This action is important in maintaining the tire 8 upon the rim even after deflation of the tire since the tire beads 6 are prevented from getting into the well of the rim 6.

The windings 8 as aforementioned prevent the highly flexible ring 1 from collapsing inwardly and downwardly when in run-flat operation. Any material or element which is light in weight and stiff in the axial direction yet flexible in the radial direction (in order that it can be flexed upon installation) may be used. For example layer 8 may comprise a ring or band of metal, fiber-reinforced plastic, e.g. fiberglass or fabric.

Braces 2 similarly may be of any light, strong, flexible material other than metal, e.g. reinforced or non-reinforced plastic. Locking of the legs to beads 6 can be accomplished by means other than that shown also.

What I claim is:

1. In combination, a pneumatic vehicle tire having non-extensible bead portions, a rim having flanges containing said bead portions, and an insert assembly to impart a run-flat capability to the tire positioned within said tire, said assembly comprising
    (a) a ring member for providing rotational support to said vehicle during run-flat operation, said ring member being spaced from said rim and said tire during non-runflat operation, said ring further having opposed lateral edges; and,
    (b) positioned between said ring and said rim, support means for said ring comprising first array of circumferentially-arranged, spaced, bracing elements depending from one said lateral edge of said ring, a second array of said bracing elements depending from the opposed lateral edge of said ring, each said bracing element having an upper end adjacent said ring and a lower end remote therefrom, each said bracing element extending outwardly from said lateral edge at an angle thereto;

said bead portions of said tire having means engaging said lower ends of said bracing elements to thereby lock said insert assembly in position within said tire, said bracing elements being movably joined to said lateral edges of said ring in order that said bracing elements may be moved outwardly into said engagement position with said beads portions after insertion of said assembly into said tire, whereby in the event of collapse of said tire upon said ring, said ring is supported by said bracing elements in contact with said bead portions contained by said flanges.

2. The combination of claim 1 wherein said ring member is a flexible, compressible ring comprised of a plurality of successively wound circumferential layers of filamentary material, said filamentary material having void spaces therebetween and being bonded together at points of contact thereof.

3. The combination of claim 2 wherein said filamentary material has a coating of elastomer.

4. The combination of claim 1 wherein said bracing elements have a general "U"-shaped configuration, and are arranged such that the closed ends of said "U" abuts said ring member.

5. The combination of claim 3 wherein reinforcing means is provided between said ring and said bracing elements, said reinforcing means acting to prevent said ring from collapsing downwardly and inwardly towards said rim in the event of collapse of said tire upon said ring.

6. The combination of claim 5 wherein said reinforcing means comprises a filament reinforced layer, the filaments in said layer being positioned generally parallel to the horizontal axis of said ring.

7. The combination of claim 6 wherein said reinforcing means comprises elastomer-coated filamentary material contacting said bracing elements and acting to space said bracing elements from one another.

8. The combination of claim 1 additionally having means to prevent circumferential expansion of said ring.

9. The combination of claim 8 wherein said additional means comprises a circumferential layer of filamentary material wherein the filaments are positioned substantially perpendicular to the horizontal axis of said ring.

10. The combination of claim 3 wherein said elastomer is rubber.

11. The combination of claim 1 wherein said lower ends of said bracing elements in each array are connected by a circumferential bead of flexible non-extensible material.

12. The combination of claim 11 wherein said lower ends of said braces are hooked to receive said circumferential bead.

13. The combination of claim 1 further having means joining opposed bracing elements in said arrays at the upper ends thereof positioned intermediate said ring and said bracing elements sufficiently rigid to prevent said ring from collapsing inwardly and downwardly when said ring is operating in the run-flat condition.

14. The combination of claim 13 wherein said joining means comprises a plurality of windings of elastomer-coated filaments, said filaments extending in a direction substantially parallel to the horizontal axis of the ring.

15. In combination, a pneumatic vehicle tire having non-extensible bead portions, a rim having flanges containing said bead portions, and an insert assembly to impart a run-flat capability to the tire positioned within said tire, said assembly comprising (a) a flexible, compressible ring comprised of a plurality of successively wound circumferential layers of elastomer-coated filamentary material, said filamentary material having void spaces therebetween and being bonded together at points of contact thereof, said ring further having opposed lateral edges, and (b) positioned between said ring and said rim, support means for said ring comprising a first array of circumferentially-arranged, spaced generally "U"-shaped bracing elements depending from one said lateral edge of said ring, a second array of said bracing elements depending from the opposed lateral edge of said ring, the closed end of said "U" of each said bracing element being movably joined to said edge of said ring, each said bracing element extending outwardly from said lateral edge at an angle thereto; the ends of said bracing elements remote from said ring in each array being joined by a continuous, flexible, non-extensible bead, said bead portions of said tire having means comprising depressions therein to receive said lower ends of said bracing elements to thereby lock said insert assembly in position within said tire, said assembly being sufficiently flexible to be inserted into said tire as an integral unit prior to mounting of said tire upon said rim, whereby in the event of collapse of said tire upon said ring member, said ring member is supported by said bracing elements in contact with said bead portions contained by said flanges.

16. An insert device to be inserted within a pneumatic vehicle tire to impart a run-flat capability to the tire, said device comprising a flexible ring member upon which said tire collapses when in the run-flat position, said ring member having means associated therewith to support said ring when in the run-flat position comprising a first array of circumferentially-arranged, spaced, bracing elements depending from the inner circumferential surface of said ring, a second array of said bracing elements also depending from said inner circumferential surface of said ring, the bracing elements in said first array being spaced from the said bracing elements in said second array, each said bracing element having an upper end portion movably joined to said ring and a lower end portion remote from said ring, said lower ends of each bracing element in an array being connected by a continuous, flexible, non-extendable bead, said lower ends of said bracing elements in each said array being movable in a direction outwardly of the vertical axis of said ring, said insert device being sufficiently flexible to be inserted within said tire prior to mounting upon a rim.

17. The device of claim 16 wherein said ring comprises a flexible, compressible ring comprised of a plurality of successively wound circumferential layers of filamentary material, said filamentary material having void spaces therebetween and being bonded together at points of contact thereof.

18. The device of claim 17 wherein said filamentary material has an elastomer coating.

19. The device of claim 16 wherein said bracing elements are hinged to said ring and have means at their lower ends for engaging the non-extensible bead portions of said pneumatic vehicle tire.

20. An insert device to impart a run-flat capability to a pneumatic vehicle tire comprising (a) a flexible, compressible ring having opposed lateral edges and comprised of a plurality of successively wound circumferential layers of elastomer coated filamentary material, said filamentary material having void spaces therebetween and being bonded together at points of contact thereof, (b) support means for said ring comprising a first array of spaced bracing elements arranged about the inner circumference of said ring and depending from one lateral edge thereof, a second array of said bracing elements depending from the other lateral edge of said ring, the lower ends of each bracing element remote from said ring in each said array being movable in a direction laterally away from the lower ends of each said bracing element remote from said ring in the other of said arrays; and (c) reinforcing means for said ring positioned between said ring and said lower ends of said bracing elements comprising a circumferential element which is flexible in its radial direction and has less flexibility in its axial direction.

21. The device of claim 20 wherein said reinforcing means comprises a filament-reinforced layer, the filaments in said layer being disposed generally parallel to the horizontal axis of said ring.

22. The device of claim 20 additionally having a circumferential, filament-reinforced layer to prevent expansion of said ring in the circumferential direction.

23. The method of producing a pneumatic vehicle tire having run-flat capability comprising the step of (a) providing a flexible run-flat insert device comprised of a (i) a flexible ring member having opposed lateral edges and (ii) a flexible support means for said ring comprising a first array of circumferentially-arranged, spaced, bracing elements depending from one said lateral edge of said ring, a second array of said bracing elements depending from the opposed lateral edge of said ring, the ends of said bracing elements remote from said ring in one array being movable in a direction away from the bracing elements in the other array and outwardly of the vertical plane of said ring, (b) providing a pneumatic vehicle tire having a pair of non-extensible bead portions, each of said bead portions having depressions therein for receiving and engaging the said ends of said bracing elements remote from said ring, (c) distorting said insert device sufficiently to insert it into said tire, and thereafter (d) moving said ends of said bracing elements remote from said ring in said first array into engaging relationship with the depressions in one of said pair of non-extensible beads of said tire, and also moving the said ends of said bracing elements remote from said ring in said second array into engaging relationship with the depressions in the remainder of said pair of non-extensible beads, whereby in the event of collapse of said tire upon said ring, said ring is supported by said bracing elements in contact with said bead portions of said tire.

* * * * *